United States Patent
Kosmicki et al.

(10) Patent No.: US 8,496,068 B1
(45) Date of Patent: Jul. 30, 2013

(54) DRAFT FORCE SENSOR ASSEMBLY

(75) Inventors: Peter A. Kosmicki, Cedar Falls, IA (US); Benjamin J. Heimbuch, Cedar Falls, IA (US); Mark S. Earley, Traer, IA (US); Edwin R. Kreis, Waterloo, IA (US); Andrew M. Tilkes, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/363,665

(22) Filed: Feb. 1, 2012

(51) Int. Cl.
*A01B 63/112* (2006.01)

(52) U.S. Cl.
USPC ............... 172/7; 280/446.1; 280/406.1

(58) Field of Classification Search
USPC . 172/7, 10, 9, 8, 11, 12, 439, 443; 73/862.57, 73/862, 541, 862.631, 862.632, 862.637; 37/348; 280/446.1, 449, 406.1, 447
See application file for complete search history.

(56) References Cited

U.S. PATENT DOCUMENTS

| | | | | |
|---|---|---|---|---|
| 3,239,013 A * | 3/1966 | Hanssmann | ................... | 172/10 |
| 3,814,188 A * | 6/1974 | Ahne | ................... | 172/7 |
| 4,173,259 A * | 11/1979 | Heckenkamp | ................... | 172/10 |
| 4,185,697 A * | 1/1980 | Berg | ................... | 172/10 |
| 4,194,574 A * | 3/1980 | Benson et al. | ................ | 172/430 |
| 4,386,533 A | 6/1983 | Jackson et al. | | |
| 4,422,341 A | 12/1983 | Espiritu Santo et al. | | |
| 4,510,814 A | 4/1985 | Espiritu Santo et al. | | |
| 4,640,368 A * | 2/1987 | Kittle et al. | ................... | 172/430 |
| 5,042,586 A | 8/1991 | Spencer et al. | | |
| 5,101,909 A | 4/1992 | VanGerpen | | |
| 5,109,707 A | 5/1992 | VanGerpen | | |
| 5,584,347 A * | 12/1996 | Bennett | ................... | 172/7 |
| 5,682,954 A * | 11/1997 | Burns | ................... | 172/7 |
| 5,988,000 A * | 11/1999 | Adams | ................... | 73/862.044 |
| 6,234,508 B1 * | 5/2001 | Tuttle et al. | ................... | 280/406.1 |
| 7,104,340 B1 * | 9/2006 | Thompson et al. | ........... | 172/677 |
| 2007/0181318 A1 * | 8/2007 | Laudick et al. | ............... | 172/810 |

OTHER PUBLICATIONS

Datum Electronics, Series 460 Bolt-On Sensors, pp. 1-2. Retrieved from the Internet: <URL: http://datum-electronics.co.uk/series-460-bolt-on-sensors.aspx>.

\* cited by examiner

*Primary Examiner* — Árpád Fábián-Kovács

(57) ABSTRACT

A draft sensing mechanism includes a draft frame adapted to be attached to a frame of a vehicle. The draft frame has left and right supports adapted to be coupled to corresponding left and right draft links. A draft strap has a left end fixed to a front side of the left support and a right end fixed to a front side of the right support. The draft strap is deflectable in response to draft forces applied to the left and right supports. A draft sensor is attached to the draft strap. The sensor generates a draft signal in response to deflection of the draft strap.

10 Claims, 2 Drawing Sheets

DRAFT FORCE SENSOR ASSEMBLY

FIELD OF THE INVENTION

The present disclosure relates to a force sensor assembly for sensing forces, such as the draft forces applied to the implement hitch of an agricultural tractor.

BACKGROUND OF THE INVENTION

Agricultural implements can be attached to a three point hitch of an agricultural tractor. A three point hitch normally includes a draft sensing mechanism which provides a draft force signal to a control system which lowers and raises the implement as a function of sensed draft force and possibly as a function of other sensed parameters, such as position, engine speed, wheel slip, etc. Some known production draft sensing mechanisms have a number of moving parts that require periodic maintenance. This includes removing mud and dirt accumulation and lubricating a draft sensor plunger to prevent moisture and dirt contamination. In certain conditions, accumulated dirt and mud can prevent the required component movement and can causes false draft force signals. Future tractor designs will have less room for such draft sensor components. Thus, it is desired to have a draft sensor which requires less space, which has no moving parts requiring lubrication and which does not need to be protected from dirt accumulation.

Other known a draft sensing mechanisms have required costly draft sensing pins, bending bars, and draft sensing shafts. Draft sensing pins require two instrument pins which double the cost and decrease the reliability. Certain current draft sensing system on John Deere four wheel drive tractors measures the deflections of the draft link mount straps. These straps are large and a large number of parts are required to measure this signal. The system also has moving parts. The bending bar and draft sensing shaft systems have moving parts and require a sealed compartment and a fair amount of space. A simpler, lower cost and more reliable draft sensing mechanism is desired.

SUMMARY

According to an aspect of the present disclosure, a draft sensing mechanism includes a draft frame adapted to be attached to a frame of a vehicle. The draft frame has left and right supports adapted to be coupled to corresponding left and right draft links. A draft strap has a left end fixed to a front side of the left support and a right end fixed to a front side of the right support. The draft strap is deflectable in response to draft forces applied to the left and right supports. A draft sensor is attached to the draft strap. The sensor generates a draft signal in response to deflection of the draft strap. The sensor is preferably attached to a front side of the draft strap. The draft frame has a central body adapted to be attached to a frame of the vehicle. The left support projects from a left front corner of the body, and the right support projects from a right front corner of the body. The central body forms a recess and the draft strap spans the recess. The draft strap has a vertical dimension which is larger than its fore-and-aft dimension. This draft sensing mechanism mechanically averages the signal with only a single sensor unit, resulting in a simpler design, decreased cost and improved reliability.

DETAILED DESCRIPTION OF THE DRAWINGS

Figure 1:
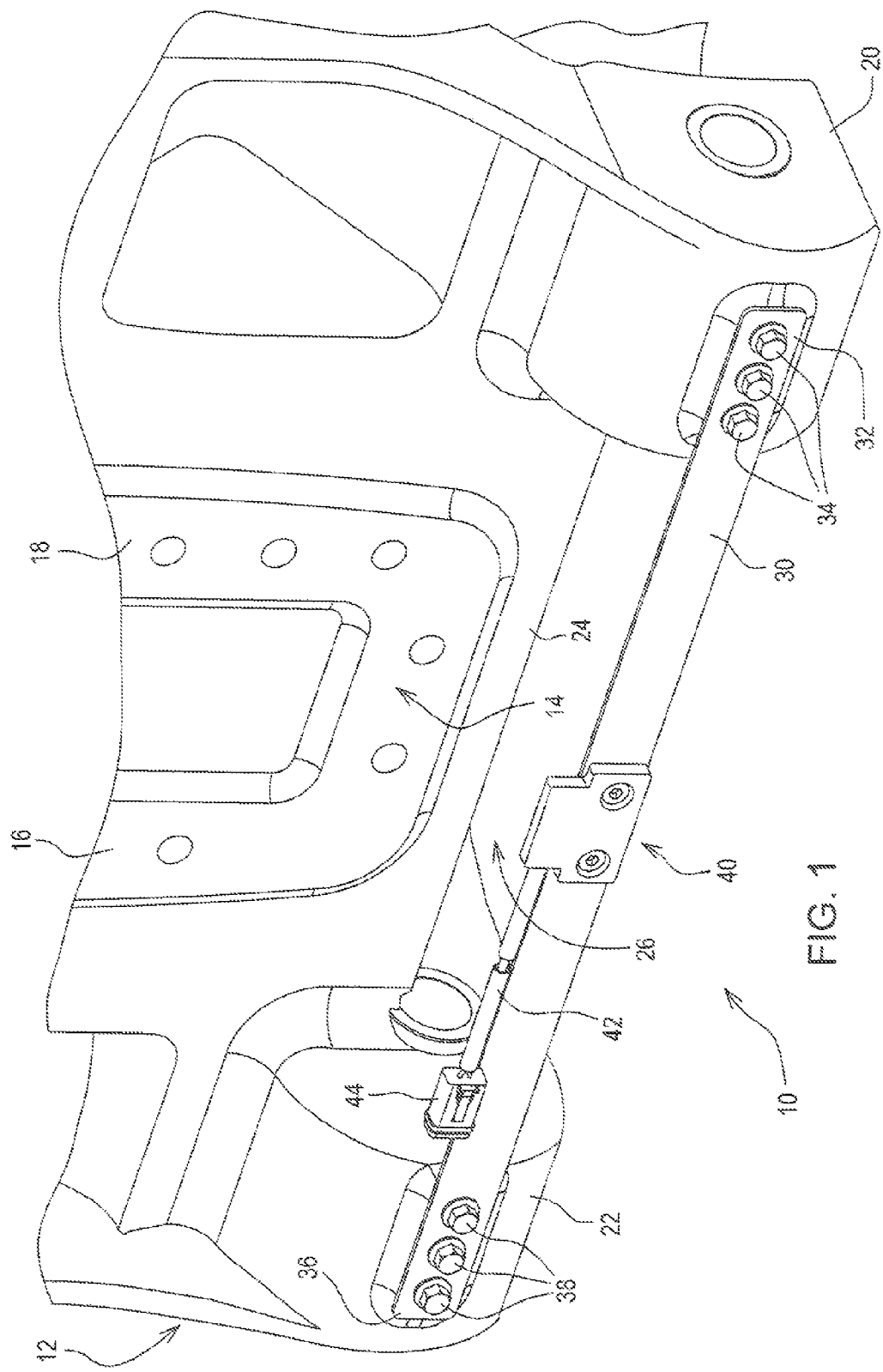
FIG. 1 is a perspective side view of a draft sensing mechanism embodying the invention.
Figure 2:
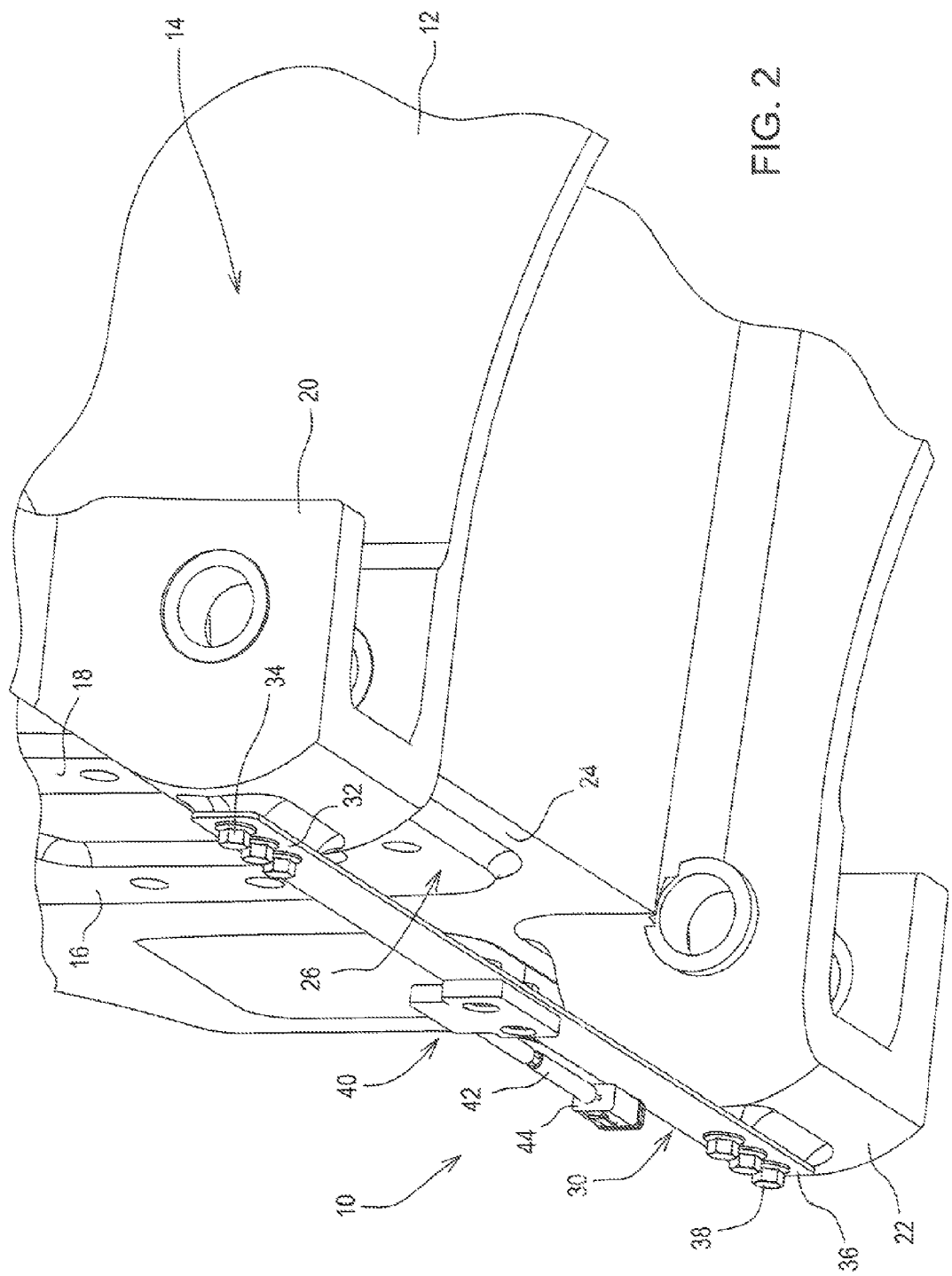
FIG. 2 is a bottom view of the draft sensing mechanism of FIG. 1.

Referring to FIGS. 1 and 2, a draft sensing mechanism 10 is attached to a draft frame 12 for a work vehicle, such as a tractor (not shown). The draft frame 12 has a central body 14 on which are formed forward facing mounting surfaces 16 and 18 for engaging rearward facing mounting surfaces (not shown) of a tractor frame (not shown). The draft frame 12 also includes a left draft link support 20 projecting from a left front corner of the body 14 and a right draft link support 22 projecting from a right front corner of the body 14. The left and right supports 20 and 22 are adapted for coupling to corresponding left and right draft links (not shown). As best seen in FIG. 1, the lower front end 24 of the body 14 is spaced apart rearwardly with respect to the front sides of the left and right supports 20 and 22.

A draft strap 30 has a left end 32 fixed, such as by bolts 34, to the front side of the left support 20, and a right end 36 fixed, such as by bolts 38, to a front side of the right support 22. Thus, a recess or gap 26 is formed between the lower front end 24 of the body 14 and the draft strap 30. Also, the draft strap 30 is spaced apart forwardly with respect to the lower front end 24 of the body 14. The draft strap 30 has vertical dimension which is larger than its fore-and-aft dimension, and its stiffness in the vertical direction is greater than its stiffness in the horizontal direction—it is more flexible in the horizontal direction so that it is more sensitive to horizontal draft forces. The draft strap 30 will be deflected by draft forces applied to the left and right supports 20 and 22.

A strain gauge sensor 40 is attached with adhesive and screws or bolts to the front side of the draft strap 30. For example, Loctite 638 may be used to bond the sensor 40 to the strap 30. Sensor 40 is preferably a full strain gage bridge and is preferably a multi-element bolt-on strain sensor, such as a Series 460 2-Hole Sensor manufactured by Datum Electronics. The sensor 40 generates a draft or draft force signal in response to deflection of the draft strap 30. A cable 42 connects the sensor 40 to a conventional electrical connector 44 for communicating the draft signal to draft control system (not shown) of the tractor (not shown).

This draft sensing mechanism 10 mechanically averages the horizontal draft load between the left draft link support 20 and the right draft link support 22. This sensed horizontal load or draft force is used as an input to a draft control system. The structure of the draft frame 12, the left draft link support 20 and the right draft link support 22 is flexible for horizontal load measurement and stiff in the vertical load direction. The shape of the draft frame 12 and the placement of the draft sensing strap 30 also helps to maximizes horizontal draft signal and minimizes vertical load signal. The draft sensing system requires very little space and does not require periodical lubrication and maintenance.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A draft sensing mechanism comprising:
a draft frame adapted to be attached to a frame of a vehicle, the draft frame having left and right supports adapted to be coupled to corresponding left and right draft links;
a draft strap having a left end fixed to a front side of the left support and a right end fixed to a front side of the right support, the draft strap being deflectable in response to draft forces applied to the left and right supports; and
a draft sensor attached to the draft strap, the sensor generating a draft signal in response to deflection of the draft strap.

2. The draft sensing mechanism of claim 1, wherein:
the sensor is attached to a front side of the draft strap.

3. The draft sensing mechanism of claim 1, wherein:
the draft frame comprises a central body adapted to be attached to a frame of the vehicle, and the left support projecting from a left front corner of the body, the right support projecting from a right front corner of the body.

4. The draft sensing mechanism of claim 3, wherein:
the draft strap is spaced apart forwardly with respect to a lower front end of the central body.

5. The draft sensing mechanism of claim 1, wherein:
the draft strap has a vertical dimension which is larger than its fore-and-aft dimension.

6. A draft sensing mechanism comprising:
a draft frame adapted to be attached to a frame of a vehicle, the draft frame having left and right supports adapted to be coupled to corresponding left and right draft links, the draft frame comprising a central body adapted to be attached to a frame of the vehicle, and the left support projecting from a left front corner of the body, the right support projecting from a right front corner of the body;
a draft strap having a left end fixed to a front side of the left support and a right end fixed to a front side of the right support, the draft strap being deflectable in response to draft forces applied to the left and right supports; and
a draft sensor attached to a front side of the draft strap, the sensor generating a draft signal in response to deflection of the draft strap.

7. The draft sensing mechanism of claim 6, wherein:
the draft strap is spaced apart forwardly with respect to a lower front end of the central body.

8. The draft sensing mechanism of claim 6, wherein:
the draft strap has a vertical dimension which is larger than its fore-and-aft dimension.

9. A draft sensing mechanism comprising:
a vehicle draft frame;
a left draft link support on a left side of the draft frame;
a right draft link support on a right side of the draft frame, the supports being adapted to be coupled to front ends of respective left and right draft links, each support having a front side, and the draft frame having a lower front end which is spaced apart rearwardly with respect to the front sides of the left and right supports;
a draft strap having a left end fixed to the front side of the left support and a right end fixed to the front side of the right support, the draft strap being deflectable in response to draft forces applied to the left and right supports, the draft strap comprising a flat body which extends laterally from the left draft link support to the right draft link support; and
a draft sensor attached to the draft strap, the sensor generating a draft signal in response to deflection of the draft strap.

10. The draft sensing mechanism of claim 9, wherein:
the sensor is attached to an outer surface of the draft strap.

* * * * *